(12) United States Patent
Becker et al.

(10) Patent No.: US 7,963,604 B2
(45) Date of Patent: Jun. 21, 2011

(54) FORWARDLY MOVABLE MOTOR VEHICLE SEAT

(75) Inventors: Burckhard Becker, Solingen (DE);
Kornel Zalavari, Solingen (DE);
Michael Leng, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 302 days.

(21) Appl. No.: 12/146,675

(22) Filed: Jun. 26, 2008

(65) Prior Publication Data
US 2009/0160234 A1    Jun. 25, 2009

(30) Foreign Application Priority Data

Jun. 29, 2007 (DE) .......................... 10 2007 030 425

(51) Int. Cl.
*A47C 1/00* (2006.01)

(52) U.S. Cl. ............... 297/341; 297/378.12; 297/378.14

(58) Field of Classification Search .................. 297/341, 297/378.12, 378.14
See application file for complete search history.

(56) References Cited

U.S. PATENT DOCUMENTS

| | | | |
|---|---|---|---|
| 5,352,019 A * | 10/1994 | Bauer et al. | 297/341 |
| 6,857,702 B2 * | 2/2005 | Becker et al. | 297/341 |
| 7,533,937 B2 * | 5/2009 | Becker et al. | 297/378.14 |
| 2006/0061175 A1 * | 3/2006 | Beneker et al. | 297/341 |

FOREIGN PATENT DOCUMENTS

| | | |
|---|---|---|
| DE | 101 51 762 | 10/2001 |
| DE | 102004061139 A1 | 1/2006 |

* cited by examiner

*Primary Examiner* — Laurie K Cranmer
(74) *Attorney, Agent, or Firm* — Summa, Additon & Ashe, P.A.

(57) ABSTRACT

The forwardly movable motor vehicle seat has a seat back (20) and a seat frame with a seat pan. The motor vehicle seat may be moved between a normal position of utilization and a forwardly moved position. An immobilizing device is associated with the seat frame. In particular, the seat back (20) has a seat back hinge (32) and a stopper device (40). The stopper device (40) retains the seat back (20) in the forward tilted position as long as the seat frame is located in a front portion of the travel path. The stopper device (40) enables said seat back to tilt upward into the normal position of utilization when the seat frame is located in a rear portion (74) of the travel path. The stopper device (40) has a first limit stop and a second limit stop, one limit stop being disposed on the seat frame and the other one on the seat back (20).

15 Claims, 6 Drawing Sheets

FORWARDLY MOVABLE MOTOR VEHICLE SEAT

CROSS-REFERENCE TO PRIORITY APPLICATION

This application hereby claims the benefit of the commonly assigned German Patent Application Serial No. 10 2007 030 425.2 (filed Jun. 29, 2007), which is hereby incorporated by reference in its entirety.

FIELD OF THE INVENTION

The present invention relates to a forwardly movable vehicle seat assembly and seat that is particularly suited for front seats of motor vehicles equipped with only one side door on each vehicle side.

BACKGROUND

In known vehicle seats, access to the rear row of seats may be eased by moving the front vehicle seat forward. Typically, a user manually moves the front seat forward, and later backward. In other words, the user introduces the forces necessary to move the motor vehicle seat forward and backward. Specifically the user grasps the upper part of the seat back and pushes the seat back together with the entire motor vehicle seat into the forwardly moved position. Thereafter, the user pushes the entire motor vehicle seat backward from a forwardly moved position to a position of use (i.e., position of utilization) wherein the user may sit and drive the vehicle. For ease of use, it is preferable for the seat to readily move forward and backward with as little force as possible applied by the user. As necessary, a motor may partially assist the forward and/or backward movement of the vehicle seat. It will be understood that in general configurations the user typically tilts the seat back rearward in a manual fashion.

Known configurations for movable vehicle seats are described in DE 10 2004 061 139 A1. Further, known forwardly movable vehicle seats are described in DE 101 51 762 A1 and to U.S. Pat. No. 5,352,019.

Known forwardly movable motor vehicle seats are typically equipped with a memory unit. The memory unit stores a position of utilization and facilitates movement of the seat to a previously adopted position of utilization when the vehicle seat is moved backward from a forwardly moved position.

A vehicle seat frame is connected to an underbody of a motor vehicle. Suited means are provided for this purpose. The invention relates to motor vehicle seat frames that are equipped with a longitudinal adjustment device comprising two pairs of rails that are lockable through a locking unit, and to motor vehicle seat frames that move forward through hinge arms articulated between the seat pan and an underbody. The invention further relates to other constructions for a longitudinal adjustment device.

As disclosed in previously cited DE 101 51 762 A1, a forwardly movable vehicle seat may include a stopper device used in connection with a seat back hinge. In a first stop position, the stopper device retains the seat back in the normal position of utilization. In a second stop position, the stopper device retains the seat back in a forwardly pivoted position. Through a special transmission means as disclosed, the stopper device is restricted to a second stop position wherein the seat back is in a front or forward portion of travel, and not in a rear portion. The disclosure contained in DE 101 51 762 A1 is incorporated in the present application.

Known forwardly movable vehicle seats to include the vehicle seat disclosed in DE 10 2004 061 139 A1 have yet to overcome one particular problem associated therewith. When known vehicle seats are moved backward from a forwardly moved position, a certain actuation force is required. The actuation force is usually applied by the user to the seat back. Upon application, the actuation force translates to and acts against the stopper device. By doing so, the actuation force advances the stopper device into the stop position in a manner more forcefully than without said actuation force. The disclosed vehicle seat incorporates two parts for ensuring that the seat back is retained in the second or forward stop position, namely a blocking cam and a limit stop. During actuation to release the seat back from the forward position, the blocking cam and limit stop are pushed against each other, such that the lever arm formed by the seat back transmits the actuation force thereby increasing the contact force between the blocking cam and limit stop. As a result, it is much more difficult to release the stopper device (i.e., separating the blocking cam and limit stop) during backward movement. Accordingly, actuation and release of the stopper device during backward movement requires a considerable release force.

SUMMARY OF THE INVENTION

It is one object of the present invention to further develop the forwardly movable motor vehicle seat according to DE 10 2004 061 139 A1 in such a manner that the stopper device can be released with less force applied to the seat back, in particular during backward movement of the motor vehicle seat. This object is solved by the features of patent claim 1.

As contrasted to the forwardly movable vehicle seat according to DE 10 2004 061 139 A1 there is now provided at least one transmission means between the blocking cam and the release device. This transmission means increases the force assisting the separation of the blocking cam and limit stop at the expense of the travel. It is preferably configured to be a lever transmission but may also be formed otherwise, in particular as a block and tackle. These configurations may also be combined. As a result, the forces which are available when the motor vehicle seat is being moved backward manually will suffice to release the stopper device.

The transmission means is defined in that it increases the force at the expense of the travel. The travel increases to the same extent as the force transmitted by the transmission means. Accordingly, the release device must travel a longer distance than in prior art, which results in an increased actuation force at the blocking cam. The force transmission of the transmission means is at least 20%, preferably at least 50% and more specifically at least 100%. With a 100% force transmission, meaning when the force is doubled, the actuation travel is also doubled.

Preferably, the stopper device is actuated and controlled such that it retains the seat back in the forward tilted position as long as the seat frame is located in a front portion of its travel. The stopper device enables the seat back to be tilted upward into the normal position of utilization if the seat frame is located in a rear portion of the travel.

The release device typically includes at least one transmission means. In one embodiment, the transmission means may include any type of flexible cable used to transmit mechanical force by the movement of an inner cable relative to a hollow outer cable housing. One such embodiment of the transmission means is commonly referred to as a "Bowden cable." In one embodiment a Bowden cable is connected to a region of the seat frame where a relative movement of parts occurs during movement of the vehicle seat (e.g., between the rails of a longitudinal adjustment device or between a hinge arm and the underbody of the vehicle). Incorporation of such a transmission means results in a desired amount of controllable force that is available and transmittable to other elements of the invention. It will be understood that the available force provided by the transmission means originates indirectly from the actuation force applied by a user. By virtue of the transmission of the actuation force by the at least one transmission means, the force needed to release the stopper device is much less than the force needed to release the stopper devices as disclosed in prior art. Generally, the release device additionally has a device for controlling the transmission means.

Moreover, the actuation force required to manipulate the seat back may be reduced by choosing a configuration that reduces the friction affecting movement of the blocking cam and/or limit stop. For example, one embodiment of the invention may incorporate a rotatable limit stop such as a pulley. In this configuration, the pulley abuts the blocking cam when the stopper device is in the stop position. The stopper device may then be released with a minimum amount of stopping force, and at any rate with less tensile force than with a limit stop configured to be a rigid bolt. By incorporating a pulley, sliding friction between the moving parts is thus avoided. As an alternative or in addition thereto, the blocking cam may also carry a pulley at its free end.

In one embodiment of the invention, the rear portion of the travel is quite short, ranging for example from 5 to 10 millimeters (mm). It is thus ensured that the seat back may only be tilted upward into the position of utilization when backward movement of the seat frame is almost completed. A certain distance is needed for the rear portion since otherwise it cannot be made certain that the seat back will release from the stopper device and adopt the position of utilization before backward movement of the seat frame has been completed.

The foregoing and other objects and advantages of the invention and the manner in which the same are accomplished will become clearer based on the following detailed description taken in conjunction with the accompanying drawings.

DETAILED DESCRIPTION

The forwardly movable vehicle seat assembly includes a seat frame having a seat back 20 and a seat carrier 22. This seat carrier 22 has a left side part 24 and a right side part (not shown). The seat back 20 is connected to the seat carrier 22 through a seat back hinge 32. The seat back hinge 32 is comprised of a lower mounting part 34 and an upper mounting part 38. The lower mounting part 34 is defined by at least a portion of the left side part 24. The upper mounting part 38 is connected to the seat back 20. The upper mounting part 38 is also connected to the lower mounting part 34 for pivotal movement about an axis 36 providing pivotal movement of the seat back. The lower mounting part 34 is fixed to the seat carrier 22 by any known conventional means. Through actually known means that are not illustrated herein, the angular position of the seat back 20 relative to the upper mounting part may be adjusted and secured. For example, one embodiment may include a toothed quadrant positioned on the upper mounting part 38 and stopper piece positioned on the seat carrier 22, wherein the quadrant and stopper piece correspondingly engage one another. In one embodiment, the upper mounting part 38 is an integral constituent part of at least one side frame part of the seat back 20.

Figure 2:
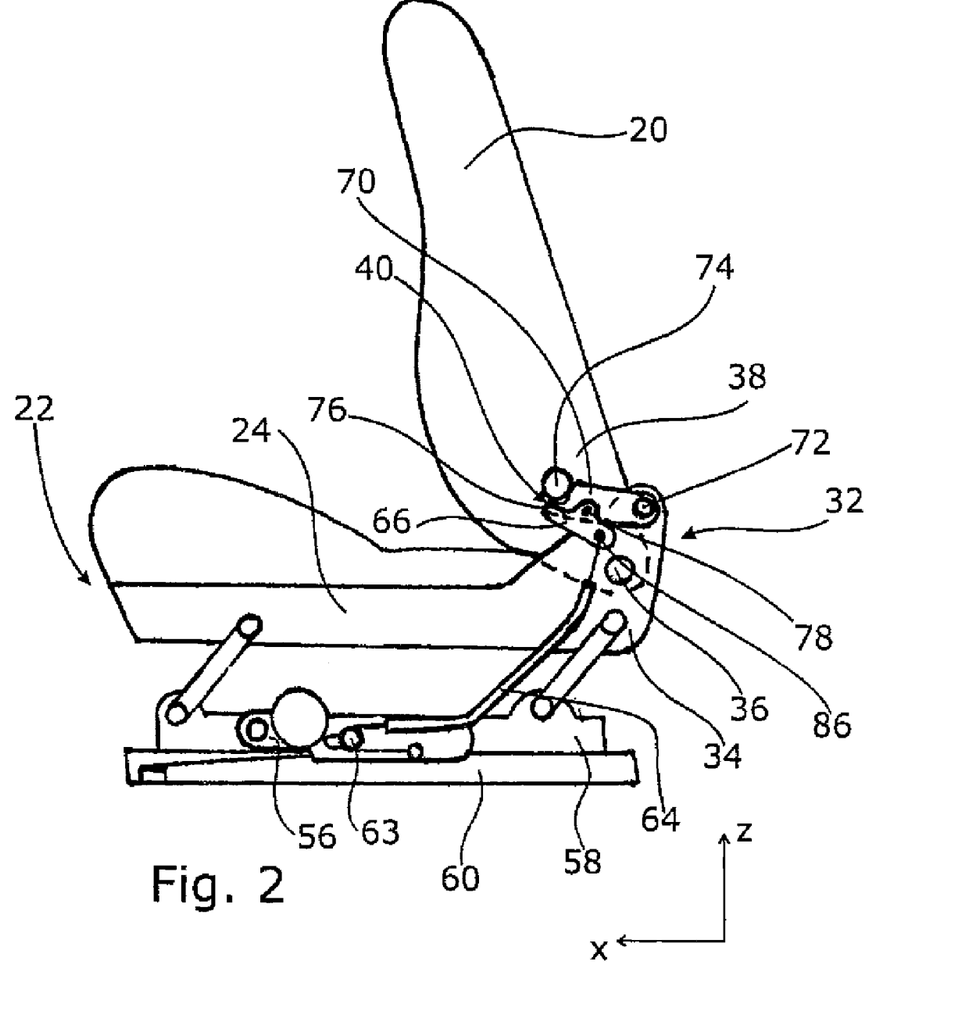
FIG. 2 is a schematic side view of the vehicle seat of FIG. 1 illustrating the vehicle seat in the forward position wherein the seat back is in the forward tilted position.

The invention further provides a stopper device 40 formed between the upper and lower mounting parts 34, 38. The stopper device 40 consists of several individual parts that will be discussed later. The stopper device 40 enables the fixed integration or fixed immobilization of the two mounting parts 34, 38 in the normal position of utilization of the vehicle seat (this function is not shown in the Figs.) such that the upper and lower mounting parts 34, 38 may operate as a single unit. Upon release of the stopper device 40, the seat back 20 may be pivoted forward from its position of utilization whereby the two mounting parts 34, 38 may pivot with respect to each other. By means of the stopper device 40, the seat back 20 is retained in a forwardly pivoted position (see e.g., FIG. 2). The stopper device 40 secures the seat back 20, and more specifically secures the seat back in the pivoted position (see FIG. 2). It will be understood that the stopper device 40 secures the seat back 20 with a forward pivotal movement of between about 40° and 50°, as measured from the position of utilization, or at an angle of about 20° to 40°, as measured from the z axis.

Via front and rear pivotal arms, the two side parts 24 of the seat carrier 22 are connected to an underframe for pivotal movement. This underframe has two pairs of rails, each pair comprising a top rail 58 and a bottom rail 60. Each pair of top and bottom rails 58, 60 are locked together through a locking unit 56 in a known way. In a known way, the bottom rails 60 are each connected to an underbody 62 of the motor vehicle.

Between the rails 58, 60 of at least one pair of rails, there is disposed a memory unit 63 as disclosed in the prior art. The memory unit 63 is exemplary of a release device. The memory unit 63 is connected to the stopper device 40 via a transmission means 64. In one embodiment, the transmission means is configured to be a Bowden cable. At an upper end region of the Bowden cable, its sheath or hollow outer housing is fixed to the seat carrier 22 or to a part connected therewith. The core or flexible cable of the Bowden cable is fixed to a first transmission lever 66 at a point of action 86. It will be understood that the point of action may include a pin, a pintle, or any known element capable of connecting the core to the first transmission lever 66. In the first exemplary embodiment, the lever 66 is the transmission means, as shown in the FIGS. 1 and 2. The transmission means is associated with the stopper device 40, which will be discussed in closer detail herein after.

The stopper device 40 has a blocking cam 70 which, in the exemplary embodiment shown, is hinged to the side part 24 for pivotal movement about a cam axis 72. The blocking cam 70 cooperates with a limit stop 74 that is fixed to the upper mounting part 38. In the first exemplary embodiment (FIGS. 1 and 2), and in the fourth exemplary embodiment (FIG. 6) as well, the blocking cam 70 is configured to be a rigid axle journal, but in the second exemplary embodiment (FIGS. 3 and 4), and in the third exemplary embodiment (FIG. 5), the blocking cam 70 is configured to be a pulley. The blocking cam 70 forms an inclined clamping surface by which it rests against the limit stop 74. Beneath this inclined clamping surface, said blocking cam 70 has a projection 76 that prevents the limit stop 74 from losing contact with the blocking cam 70.

Figure 1:
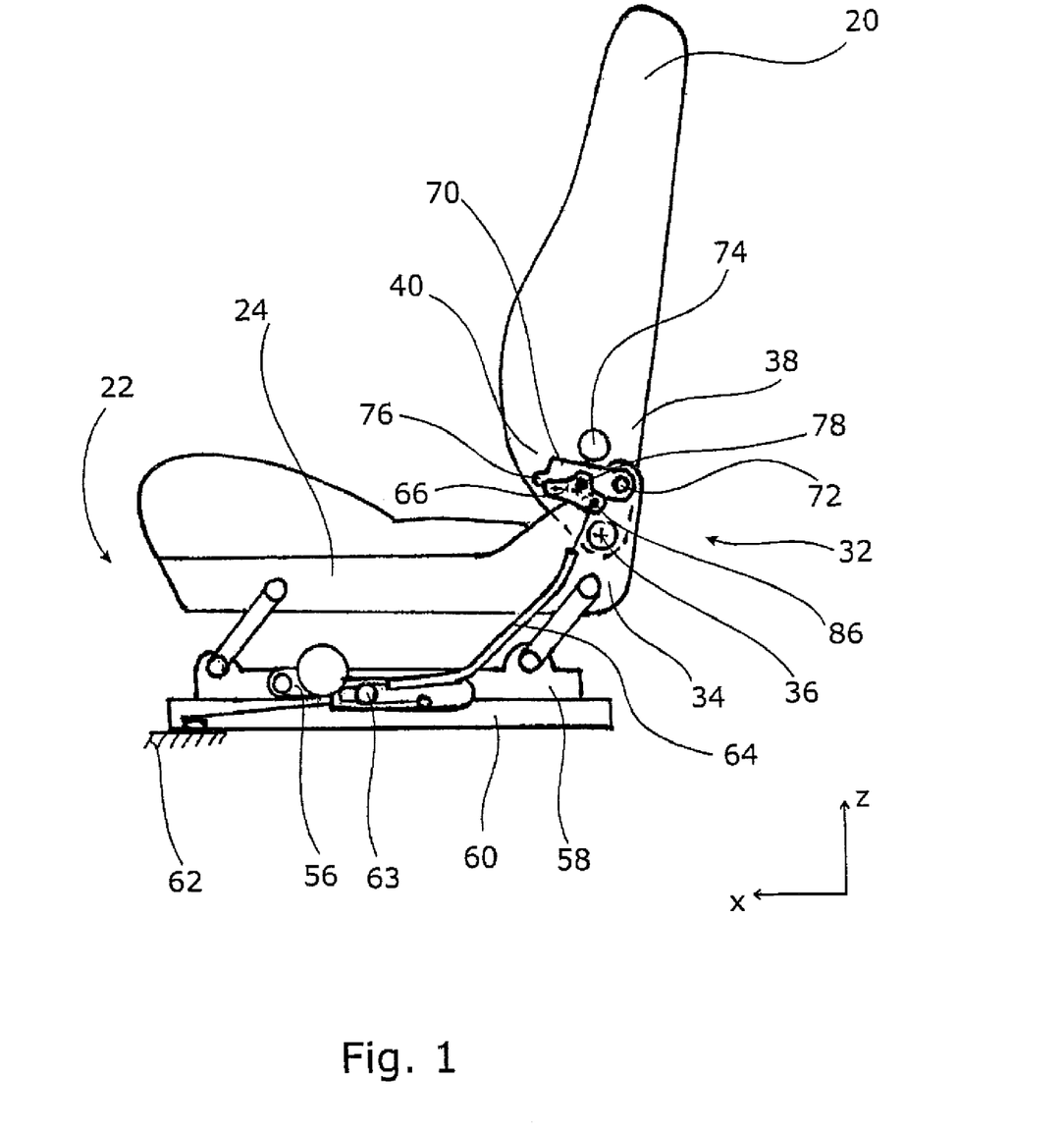
FIG. 1 is a schematic side view of a first embodiment of a vehicle seat in its position of use (i.e., in a rearward position)

Approximately in its center region, the first transmission lever 66 has a lever axis 78 where it is articulated to the blocking cam 70. The lever axis 78 is hereby closer to the inclined clamping surface than to the cam axis 72. The first transmission lever 66 has a left arm, the free end of which is located approximately in the same position as the inclined clamping surface of the blocking cam 70. As shown in the embodiment depicted in FIG. 2, this left arm of the first transmission lever 66 abuts the limit stop 74. It will be understood, however, that the left arm may be located in immediate proximity to this limit stop 74. If a downward directed force is introduced at the right arm of the first transmission lever 66 through the core of the Bowden cable 64, the left arm abuts the limit stop 74 and the lever axis 78 is pulled downward with the transmission of force. As a result, the blocking cam 70 is also pivoted downward to form a sufficient air gap between the limit stop 74 and the inclined clamping surface. In this configuration, the vehicle seat may be moved from the forward position depicted in FIG. 2 back into the position of utilization as shown in FIG. 1.

Figure 3:
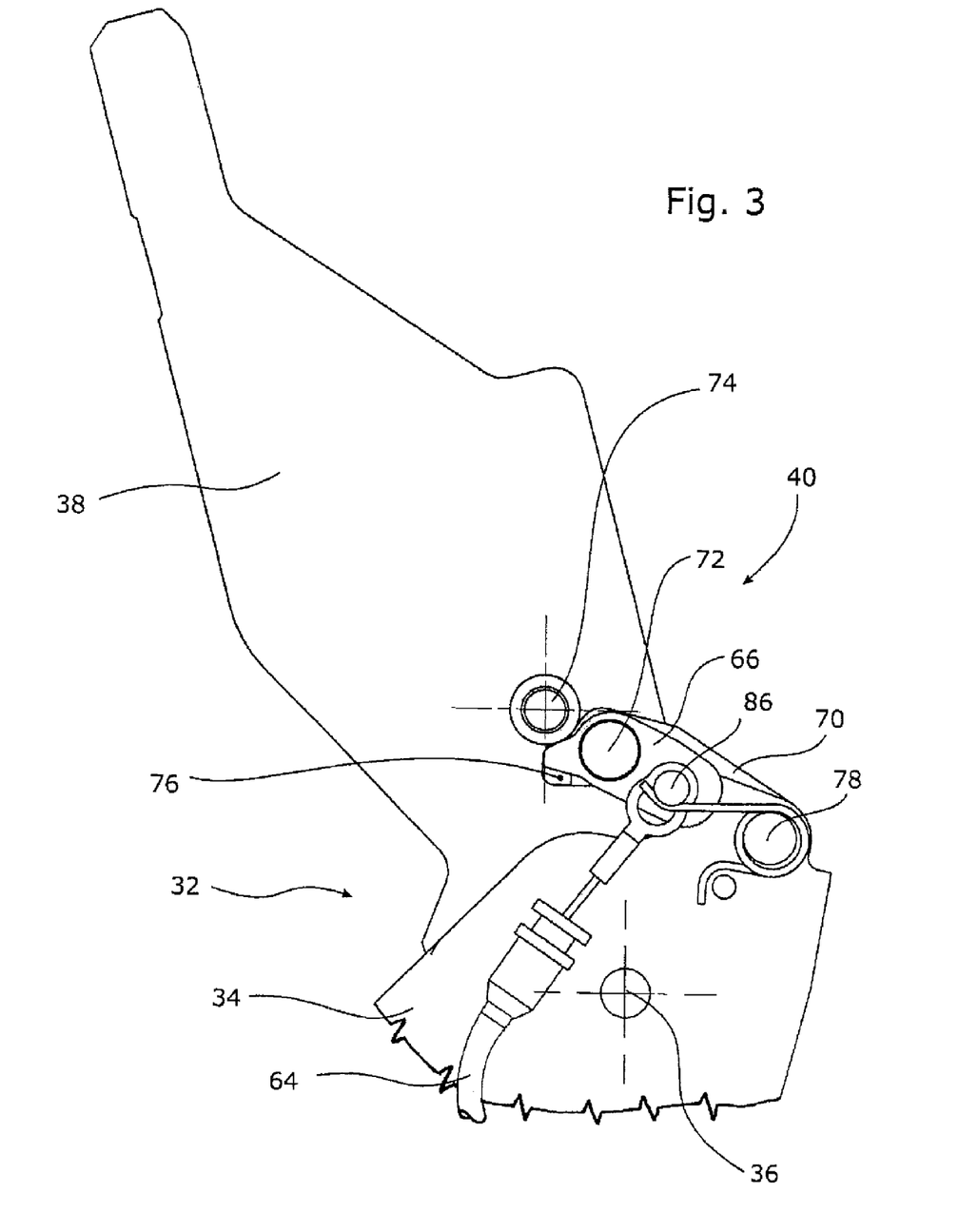
FIG. 3 is a partial schematic side view of a second embodiment of the vehicle seat illustrating a seat back hinge wherein the seat back hinge is in the forwardly moved position.
Figure 4:
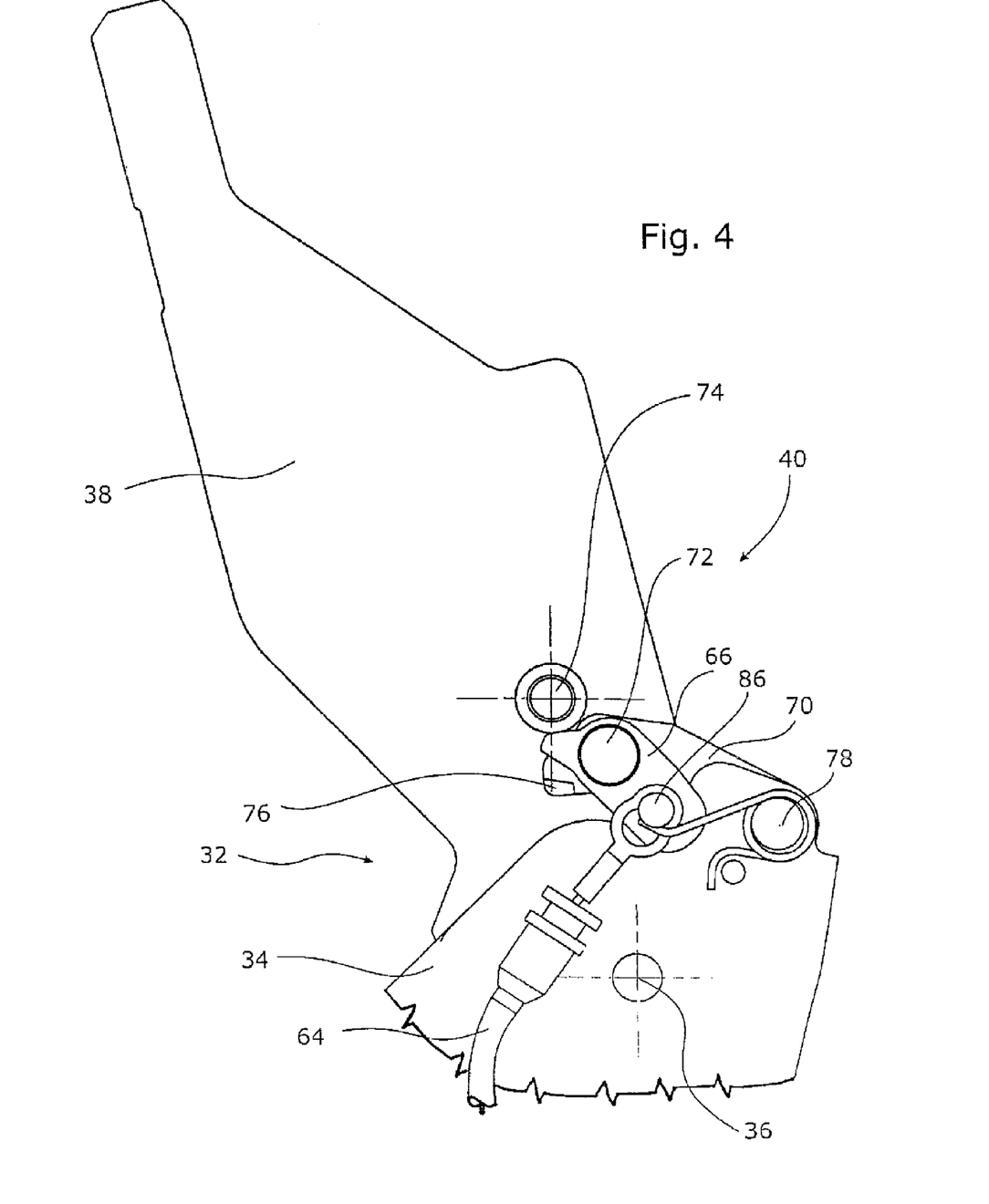
FIG. 4 is a partial schematic side view of the second embodiment of the vehicle seat of FIG. 3 illustrating the seat back prepared for backward movement, wherein a release device has been actuated (i.e., a blocking cam has been released from a limit stop) to facilitate backward movement of the seat back into the position of use.

The second exemplary embodiment shown in the FIGS. 3 and 4 coincides with the first exemplary embodiment insofar as the transmission means is formed by a lever gear and again only comprises one transmission lever, namely the first transmission lever 66. In contrast to the configuration shown in the first exemplary embodiment of FIG. 1, the cam axis 72 is now offset very far towards the left or forward (with respect to the present figure) in the first transmission lever 66 so that the ratio between the right lever arm and the left lever arm amounts to approximately 2:1 on the one side; on the other side, the lever axis 78 is also disposed in another position on the blocking cam 70, namely much closer to the inclined clamping surface, so that the lever ratio now amounts to approximately 4.5:1. As a result, the lever transmission is now greater than in the first exemplary embodiment.

Figure 5:
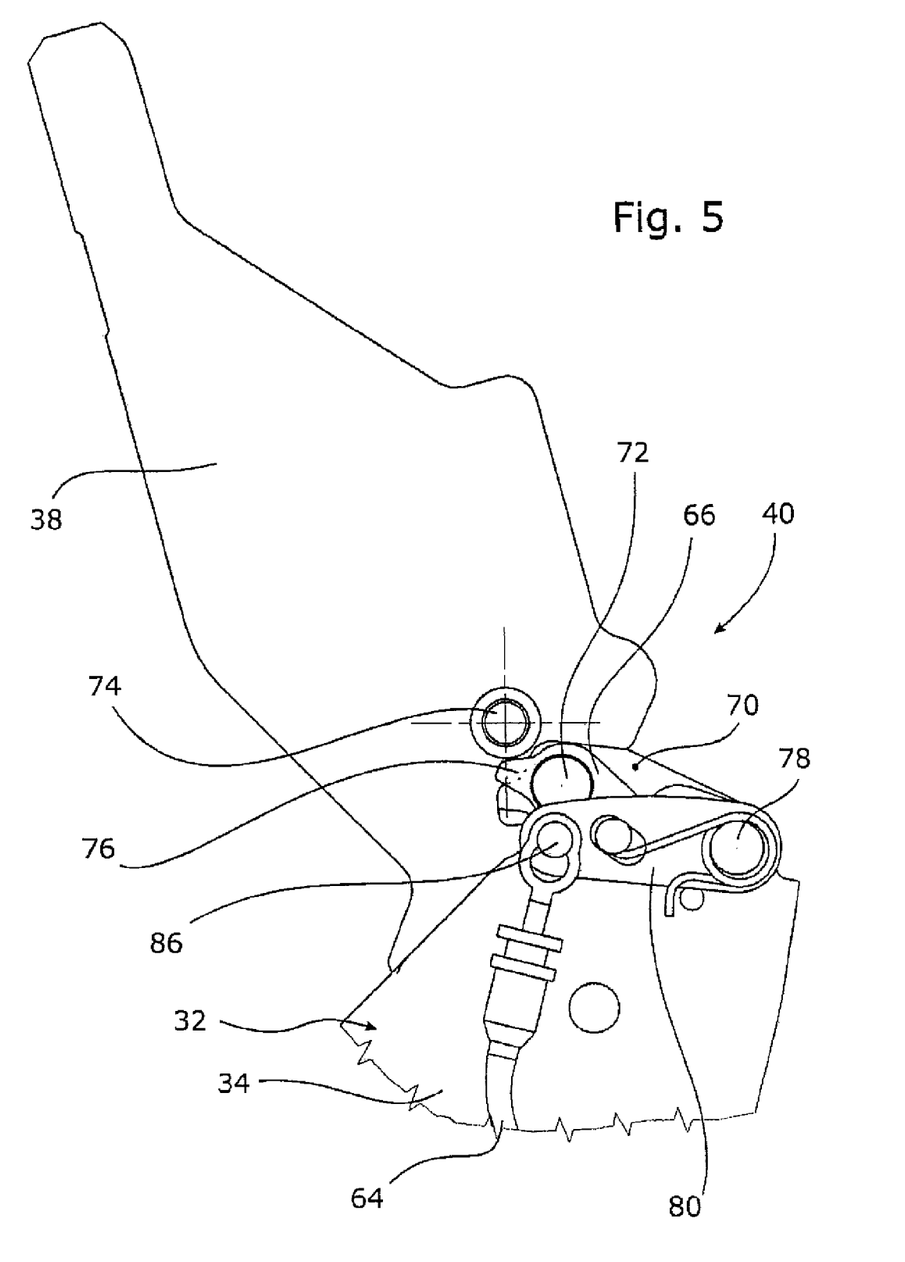
FIG. 5 is a partial schematic side view of a third embodiment of the vehicle seat illustrating an additional transmission lever.

In the third exemplary embodiment shown in FIG. 5, the transmission means is formed by a lever gear; though a second transmission lever 80 is additionally provided. The blocking cam 70 corresponds to the blocking cam of the second exemplary embodiment; the first transmission lever 66 is configured similarly. The transmission means 64 now does not act onto the first transmission lever 66 in the point of action 86 for the Bowden cable, but onto the second transmission lever 80. The second transmission lever 80 is a one-arm lever and has a lever axis 78 as its axis by which it is fixed at its right end to the lower mounting part 34. The second transmission lever 80 also includes a long hole 84. In the second exemplary embodiment the pin of the first transmission lever 66 to which the Bowden cable 64 is connected engages through this long hole 84. Finally, the second transmission lever 80 has a point of action 86 for the Bowden cable. The lever ratio, meaning the distance between the second lever axis 82 and the point of action 86 as compared to the distance between the long hole 64 and the second lever axis 82, effects a power transmission. The arrangement consisting of the first transmission lever 66 and the second transmission lever 80 forms a pair of scissors as can be seen from FIG. 5.

In the alternative in which the limit stop 74 is configured to be a pulley, this pulley may be realized in various manners. It may be any rotatable part. The circumference of the limit stop or pulley 74 must not extend over 360°. For example a smaller angular range of approximately 90° c.is sufficient. The surface of the pulley 74 may be hard or elastic. For example, the surface of the pulley 74 may be formed by an O ring made from rubber, which is resilient. The pulley 74 may also be toothed.

The features of individual claims may be combined, even if the claims are not directly referred to each other.

Figure 6:
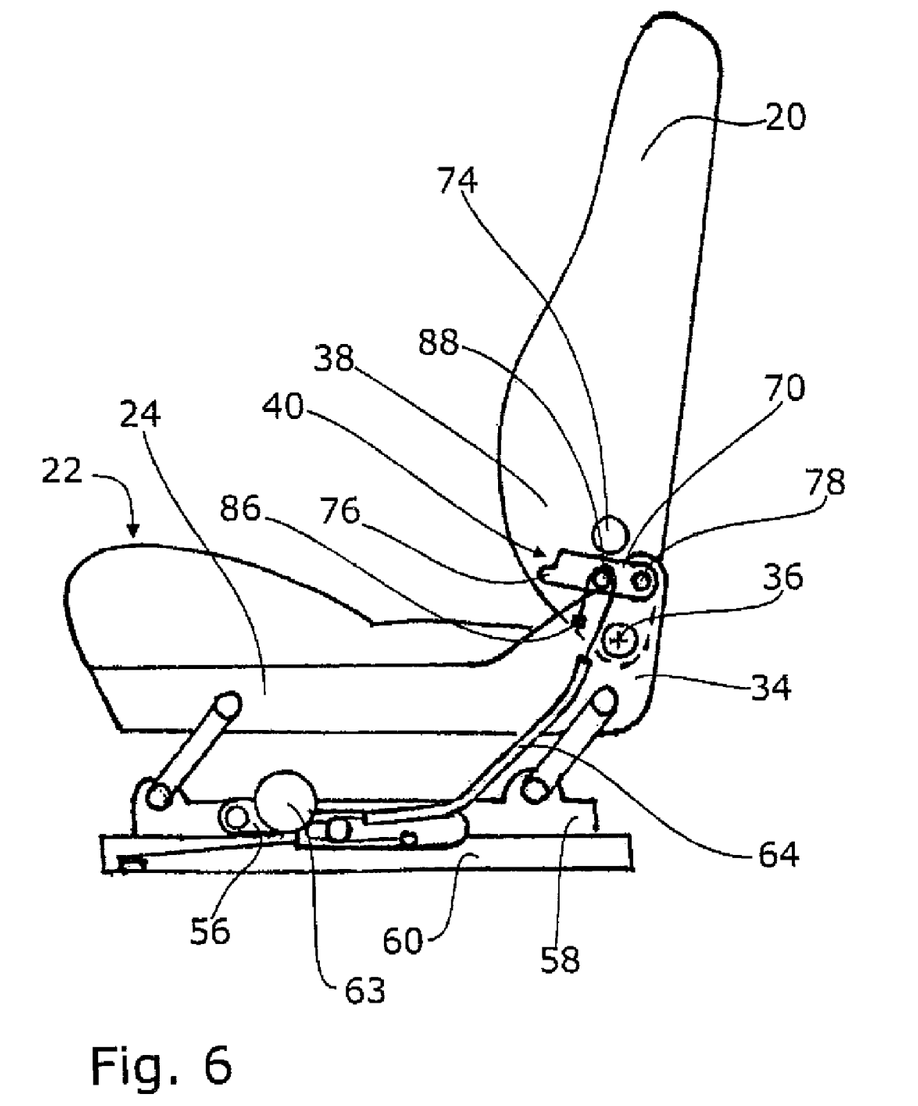
FIG. 6 is a schematic side view of a fourth embodiment of the vehicle seat illustrating a block and tackle with a deflection pulley as a transmission means.

In the fourth exemplary embodiment shown in FIG. 6, the transmission means is configured to be a block and tackle. As it is obvious when viewing it, this exemplary embodiment largely corresponds to the first exemplary embodiment. The fourth embodiment of the invention does not include a first transmission lever hinged to the blocking cam 70. Rather, the fourth embodiment provides a rotatable deflection pulley 88 located at the same position and having the same axis of rotation as the first transmission lever of the earlier embodiments. The core of the Bowden cable 64 is fastened at the point of action 86 that is positioned on the lower mounting part 34. The core of the Bowden cable 64 surrounds the deflection pulley 88. As a result of this configuration, the transmission force is doubled, but the travel distance is now twice the length of the travel distance in the earlier embodiments. It is possible and advantageous to position the deflection pulley 88 closer to the inclined clamping surface. It is also advantageous to provide for at least one additional deflection pulley, so that the force transmission of the block and tackle is increased.

The invention claimed is:

1. A forwardly movable motor vehicle seat, in particular a front seat of a motor vehicle equipped with only one side door on each vehicle side, said vehicle seat comprising:
   one seat frame having a seat pan and one seat back (20), said seat back (20) being disposed for pivotal movement about an axis (36) of pivotal movement with respect to said seat frame, said motor vehicle seat being movable between a normal position of utilization and a forwardly moved position, said seat frame having been moved forwardly in the forwardly moved position and said seat back (20) being in a forward tilted position in which it is tilted forward toward said seat pan;
   a stopper device (40) being further associated with said seat back (20) for retaining said seat back (20) in the forward tilted position in the forwardly moved position and for enabling said seat back (20) to tilt upward into the normal position of utilization when said motor vehicle seat is moved back into its position of utilization, said stopper device comprising a blocking cam (70) and a limit stop (74) associated with said blocking cam (70);
   a release device that is associated with said stopper device (40) and releases said stopper device (40) when said motor vehicle seat is being moved back to the position of utilization; and
   at least one transmission means provided between said blocking cam (70) and said release device;
   wherein said blocking cam (70) is pivotally connected to a portion of said seat frame and said limit stop (74) is connected to a portion of said seat back (20).

2. The forwardly movable motor vehicle seat as set forth in claim 1, wherein:
the transmission means is configured to be a lever transmission, said lever transmission comprises at least one transmission lever (66, 80) that is connected to said blocking cam (70) for pivotal movement; and
said release device acts on said at least one transmission lever (66, 80).

3. The forwardly movable motor vehicle seat as set forth in claim 1, wherein:
the transmission means is configured to be a block and tackle that comprises at least one deflection pulley (88) about which a Bowden cable (64) is guided; and
the transmission means further comprises at least one additional deflection pulley.

4. The forwardly movable motor vehicle seat as set forth in claim 1, wherein said limit stop (74) is a rotatable part that abuts said blocking cam (70) in said stop position.

5. The forwardly movable motor vehicle seat as set forth in claim 4, wherein said limit stop (74) is a pulley that abuts said blocking cam (70) in said stop position.

6. The forwardly movable motor vehicle seat as set forth in claim 1, wherein at least a portion of said blocking cam (70) defines an inclined clamping surface positioned substantially adjacent to said limit stop (74).

7. The forwardly movable motor vehicle seat as set forth in claim 1, wherein said blocking cam (70) comprises a projection which, in said stop position, is in immediate proximity to, more specifically in contact with, said limit stop (74).

8. The forwardly movable motor vehicle seat as set forth in claim 1, wherein said transmission means is interposed between the seat frame and the stopper device (40).

9. The forwardly movable motor vehicle seat as set forth in claim 1, wherein said release device is configured to be a Bowden cable (64).

10. A forwardly movable motor vehicle seat, in particular a front seat of a motor vehicle equipped with only one side door on each vehicle side, said vehicle seat comprising:
one seat frame having a seat pan and one seat back (20), said seat back (20) being disposed for pivotal movement about an axis (36) of pivotal movement with respect to said seat frame, said motor vehicle seat being movable between a normal position of utilization and a forwardly moved position, said seat frame having been moved forwardly in the forwardly moved position and said seat back (20) being in a forward tilted position in which it is tilted forward toward said seat pan;
a stopper device (40) being further associated with said seat back (20) for retaining said seat back (20) in the forward tilted position in the forwardly moved position and for enabling said seat back (20) to tilt upward into the normal position of utilization when said motor vehicle seat is moved back into its position of utilization, said stopper device comprising a blocking cam (70) and a limit stop (74) associated with said blocking cam (70);
a release device that is associated with said stopper device (40) and releases said stopper device (40) when said motor vehicle seat is being moved back to the position of utilization; and
at least one transmission means provided between said blocking cam (70) and said release device;
wherein said blocking cam (70) is pivotally connected to a portion of said seat back (20) and said limit stop (74) is connected to a portion of said seat frame.

11. A forwardly movable motor vehicle seat assembly comprising:
a seat frame having a seat carrier (22) and a seat back (20), said seat back (20) pivotally connected at a lower part to said seat carrier, said seat frame moveable between a normal position of use and a forwardly moved position wherein said seat back (20) is tilted forward toward said seat carrier (22);
an upper mounting part (38) connected to at least one side of said seat back (20);
a lower mounting part (34) connected to at least one side of said seat carrier (22), said upper and lower mounting parts pivotally connected to one another;
a stopper device (40) positioned on side portions of said upper and lower mounting parts (38, 34), said stopper device comprising a blocking cam (70) and a limit stop (74), said stopper device for retaining said seat back (20) in the forward tilted position in the forwardly moved position, and for enabling said seat back (20) to tilt upward into the normal position of use when said seat frame is moved back into its position of use;
a release device operatively connected to said stopper device (40), said release device for releasing said stopper device (40) when said seat frame is moved back to the position of use; and
at least one transmission device positioned between said blocking cam (70) and said release device, said transmission device for increasing a force acting on said seat back during backward movement of said seat frame, and thereby minimizing the force required to release said stopper device;
wherein said blocking cam (70) is pivotally connected to a portion of said lower mounting part (34) and said limit stop (74) is connected to a portion of said upper mounting part (38).

12. The forwardly movable motor vehicle seat assembly as set forth in claim 11, wherein said at least one transmission device is a transmission lever (66) pivotally connected to said blocking cam.

13. The forwardly movable motor vehicle seat assembly as set forth in claim 11, wherein said at least one transmission device is a block and tackle.

14. A forwardly movable motor vehicle seat assembly comprising:
a seat frame having a seat carrier (22) and a seat back (20), said seat back (20) pivotally connected at a lower part to said seat carrier, said seat frame moveable between a normal position of use and a forwardly moved position wherein said seat back (20) is tilted forward toward said seat carrier (22);
an upper mounting part (38) connected to at least one side of said seat back (20);
a lower mounting part (34) connected to at least one side of said seat carrier (22), said upper and lower mounting parts pivotally connected to one another
a stopper device (40) positioned on side portions of said upper and lower mounting parts (38, 34), said stopper device comprising a blocking cam (70) and a limit stop (74), said stopper device for retaining said seat back (20) in the forward tilted position in the forwardly moved position, and for enabling said seat back (20) to tilt upward into the normal position of use when said seat frame is moved back into its position of use
a release device operatively connected to said stopper device (40), said release device for releasing said stopper device (40) when said seat frame is moved back to the position of use and
at least one transmission device positioned between said blocking cam (70) and said release device, said transmission device for increasing a force acting on said seat back during backward movement of said seat frame, and thereby minimizing the force required to release said stopper device;

wherein said blocking cam (70) is pivotally connected to a portion of said upper mounting part (38) and said limit stop (74) is connected to a portion of said lower mounting part.

15. A forwardly movable motor vehicle seat assembly comprising:

a seat frame having a seat carrier (22) and a seat back (20), said seat back (20) pivotally connected at a lower part to said seat carrier, said seat frame moveable between a normal position of use and a forwardly moved position wherein said seat back (20) is tilted forward toward said seat carrier;

an upper mounting part (38) connected to at least one side of said seat back (20);

a lower mounting part (34) connected to at least one side of said seat carrier (22), said upper and lower mounting parts pivotally connected to one another;

a blocking cam (70) pivotally connected to said lower mounting part (34), said blocking cam defining an inclined clamping surface at one end;

a limit stop (74) connected to said upper mounting part (38), at least a portion of said limit stop engaging said inclined clamping surface of said blocking cam (70) to retain said seat back (20) in the forward tilted position in the forwardly moved position, said blocking cam and said limit stop cooperating to enable said seat back (20) to tilt upward into the normal position of use when said seat frame is moved back into its position of use;

at least one transmission lever (66) articulated to said blocking cam (70), said transmission lever for increasing a force acting on said seat back (20) during backward movement of said seat frame, and thereby minimizing the force required by a user to release said blocking cam (70) from said limit stop (74); and a release device operatively connected to said transmission lever (66), said release device for releasing said blocking cam (70) from said limit stop (74) when said motor vehicle seat is moved back to the position of use.

* * * * *